Sept. 9, 1958 M. M. SEELOFF ET AL 2,850,909
INDEXING MECHANISM
Filed Nov. 30, 1951 3 Sheets-Sheet 1
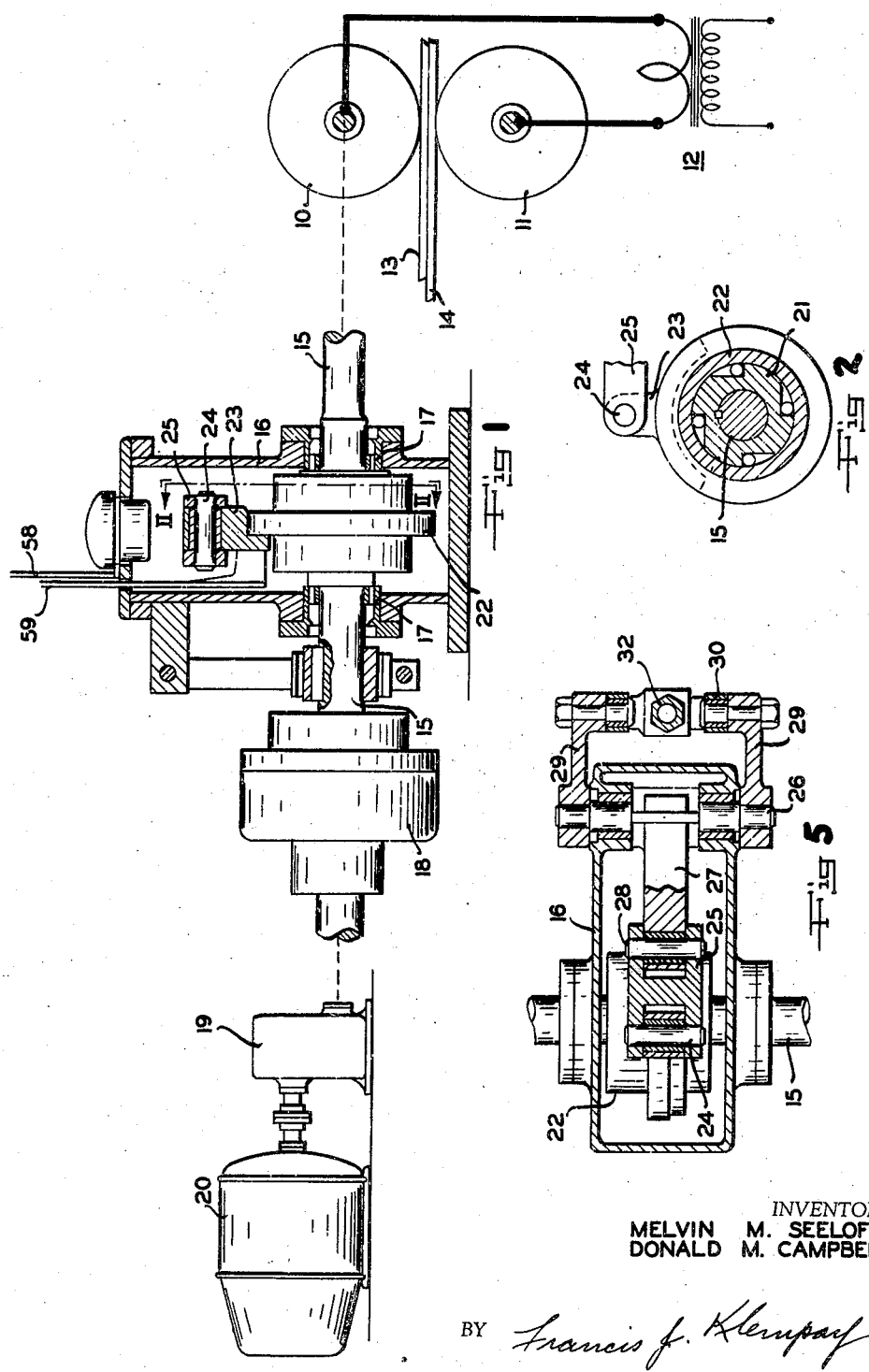
INVENTORS
MELVIN M. SEELOFF
DONALD M. CAMPBELL
BY Francis J. Klempay
ATTORNEY

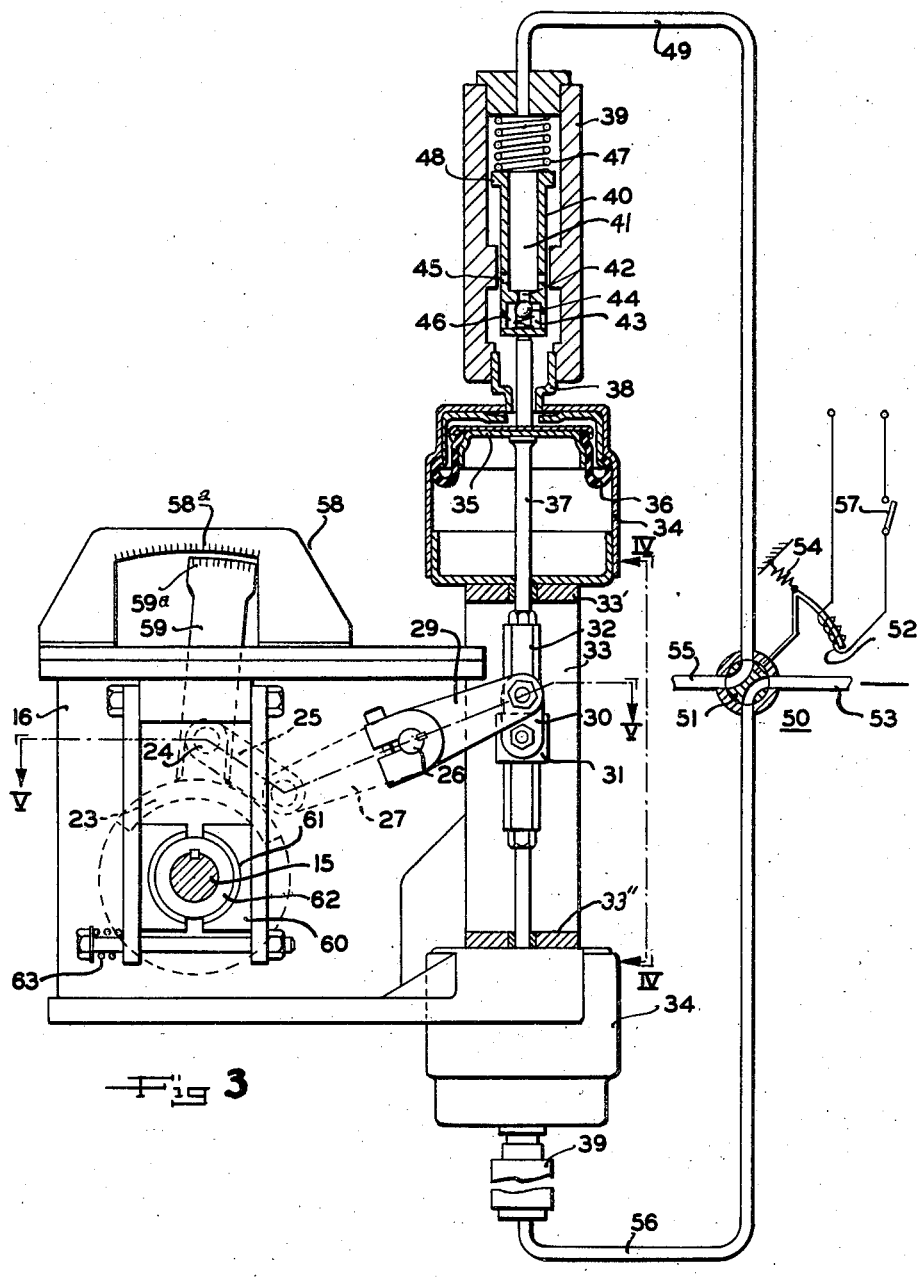

Sept. 9, 1958   M. M. SEELOFF ET AL   2,850,909
INDEXING MECHANISM
Filed Nov. 30, 1951   3 Sheets-Sheet 3

INVENTORS
MELVIN M. SEELOFF
DONALD M. CAMPBELL

BY Francis J. Klempay
ATTORNEY

United States Patent Office 2,850,909
Patented Sept. 9, 1958

2,850,909

INDEXING MECHANISM

Melvin M. Seeloff and Donald M. Campbell, Warren, Ohio, assignors to The Taylor-Winfield Corporation, Warren, Ohio, a corporation of Ohio Application November 30, 1951, Serial No. 259,168

11 Claims. (Cl. 74—128)

This invention relates to improved mechanical apparatus for driving machine elements primarily in an intermittent manner and has at its principal object the provision of practical apparatus for driving machine elements in a highly versatile manner as regards position-time relationships. Intermittent or step-by-step actuation is required in many machines and while various types of mechanisms, notably the Geneva gear and ratchet devices, have been proposed for this purpose, such prior devices have either been limited in their versatility or are of such complexity and high cost as not to be generally useful. The present invention seeks to provide a relatively simple and economical mechanical assembly capable of driving machine elements in a highly versatile manner—either continuously or intermittently as desired—and if intermittently driven capable of being readily adjusted to infinitely vary not only the dimension of movement in each operation but also the speed of movement and the time interval elapsing between successive actuations or movements of the machine part being driven.

Apparatus of the above nature is highly useful in resistance welding apparatus, for example, in driving the roller electrodes of the "roller-spot" or seam welding type wherein the overlapped work pieces to be welded together are inserted between a pair of roller electrodes which are continuously driven to effect an uninterrupted seam weld in the work or intermittently driven and energized to effect a multiplicity of spaced spot welds in the work. It is highly desirable that such resistance welding machines be versatile in operation so that the pattern of spot welds may be readily changed while the speed of mechanical operation of the machine may be readily correlated with the nature of the work at hand and the electrical capacity of the machine to enable the machine to operate at its maximum productive rate. These general objects are accomplished by our invention through the use in combination with the conventional rotating drive of an improved intermittent air-operated drive which is operative to take over immediately upon deenergization of the rotating drive and which is infinitely adjustable as to the dimension of indexing movement, within the capacity of the machine, as to the speed of such movement, and as to the time periods elapsing between successive movements of the driven element. Likewise, continuous movement of the driven element may be reinitiated instantaneously at any desired time so that a widely varying time-movement pattern of the driven element may be effected.

Another object of the invention is the provision in air-operated intermittent drives of improved motive means whereby the longevity of the apparatus is improved, the actuations are highly responsive to control due to reductions in inertia and starting friction of the parts, wherein high speed operation may be obtained with a reduction in the number of actuations of the control valve employed, and wherein the reciprocating parts of the assembly are automatically and effectively cushioned against shock at either end of their strokes.

The above and other objects and advantages of the invention will become apparent upon consideration of the following detailed specification and the accompanying drawing wherein there is disclosed a certain preferred embodiment of the invention.

In the drawing:

Figure 1 is a schematic view, with parts shown in section, of a driving apparatus for rotary welding electrodes constructed in accordance with the principles of our invention;

Figure 2 is a fragmentary section taken along the line II—II of Figure 1;

Figure 3 is a side elevation of the appaartus of Figure 1 and showing the air motors and control therefor utilized in the assembly of Figure 1;

Figure 5 is a horizontal section taken along the line V—V of Figure 3; and

Figure 4:
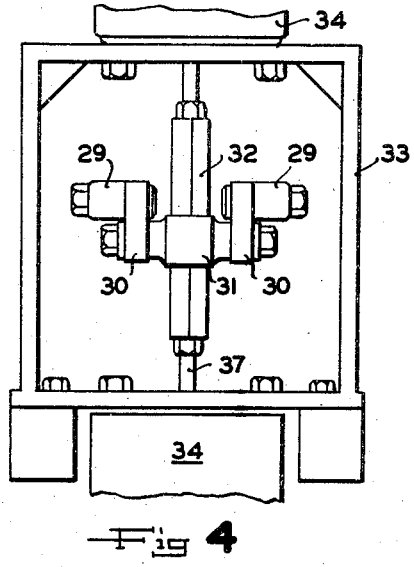
Figure 4 is a fragmentary elevation looking in the direction of the arrows IV—IV of Figure 3.

Referring to the drawing and first particularly to Figure 1 reference numeral 10 designates a driven electrode while reference numeral 11 designates a cooperating idler electrode of a seam or roller-spot electric resistance welder having a welding transformer 12 the secondary of which is connected to the electrodes 10 and 11. In accordance with usual practice, overlapped work pieces 13 and 14 are fed between the electrodes 10 and 11 to be welded together either by an uninterrupted seam or by a series of longitudinally spaced spot welds. The driven electrode 10 propels the work through the machine and if spot welds are to be effected, as in heavier gauge material, for example, it is usually necessary to interrupt movement of the electrodes and work during the time required to effect a welding cycle. The time interval for this "dwell" as well as the extent of indexing movement of the electrodes between welds is readily adjustable in the normal operation of our apparatus as will be explained below.

Electrode 10 is arranged to be driven by a shaft 15 which extends through an oil-tight housing 16, being journaled therein in anti-friction bearing 17. Beyond the housing 16 the shaft 15 is connected through an over-running clutch 18 of the multiple roller type to a gear reducer 19 driven by motor 20. The reducer 19 may well be of the variable speed type as will be understood. Thus, the electrode 10 may be driven continuously at a predetermined speed by the motor 20 whenever desired and in a direction tending to advance the work through the machine, it being understood that the energization of motor 20 will be effected by suitable control apparatus, not shown, and that the clutch 18 will be properly oriented to give the proper direction of drive.

Keyed to the shaft 15 within the housing 16 is the inner member 21 of a multiple roller over-running clutch having an outer race 22 whose outer flanges revolve freely on the shaft 15 outwardly of the part 21. Of course, the race 22 will be constructed in two parts to permit assembly of the apparatus as will be understood. A segmental lug 23 is integral with or rigidly secured to the outer periphery of the race 22 and pivotally connected to this lug by pin 24 is a toggle link 25. Extending through and journaled in the opposed side walls of the housing 16 is a shaft 26 to which is rigidly keyed a lever 27 which is contained within the housing 16 and which is pivotally connected at its free end to the free end of link 25 by means of pin 28.

Rigidly secured and keyed to each projecting end of the shaft 26 is a rearwardly extending lever 29 each of which is pivotally connected at its free end to a short link 30. The free ends of the links 30 are in turn pivotally connected to a crosshead 31. Crosshead 31 mounts a turnbuckle 32, it being understood that while the turnbuckle 32 can be rotated with respect to the member 31 the mounting is such that there is no axial movement of the turnbuckle with respect to the member 31.

Rigidly mounted on the casing 16 is an open frame 33 having top and bottom struts 33′ and 33″, respectively, on each of which is mounted the outer shell or cylinder 34 of an air-operated device having in addition to the outer shell a piston 35 the outer periphery of which is connected to the side wall of the outer shell by a flexible rolling ring 36. Piston 35 is mounted on a centrally disposed rod 37 which is threaded at its lower end for engagement in the turnbuckle 32 and, as shown, the outer end of the rod 37 projects outwardly of the shell 34 through a fitting 38 and into a tubular member 39 which houses a cushioning valve now to be described. Since the air motor and the cushioning valve is identical for opposite ends of the turnbuckle 32 only one of the assemblies will be shown and described in detail.

Tubular member 39 has a centrally disposed bore extending entirely through it and slidably received in a centrally disposed section of this bore which is of reduced diameter is a valve core 40 which has a bore 41 in it extending downwardly from its top end and terminating at a horizontal wall in which is formed a small aperture 42. Cooperating with aperture 42 and housed within a cavity 43 formed in the lower end portion of the core 40 is a spring pressed ball check 44 which normally seals off aperture 42. The side walls of the core 40 are apertured at 45 at the lower end portion of bore 41 and at 46 at the location of the cavity housing ball 44. Core 40 is urged to inner position by a coil spring 47 housed in the outer end portion of the tubular member 39 but inward movement of the core is limited by engagement of the flange 48 on the upper end of the core with the shoulder provided by the outer end of the restricted portion of the bore in the member 39. The space within the outer end portion of the member 39 is connected by conduit 49 leading to a cylinder port of a 4-way valve 50. As schematically shown the valve 50 has a movable core 51 arranged to be moved into one of its operating positions by energization of a solenoid 52 whereby the conduit 49 is connected to a fluid pressure supply conduit 53 and into the other of its positions by a return spring 54 whereby the conduit 49 is connected to exhaust 55. The opposing air motor of the assembly is connected to the other cylinder port of the 4-way valve 50 through a conduit 56 which is connected to the pressure supply line 53 when solenoid 52 is deenergized but which is connected to exhaust 55 when solenoid 52 is energized. Solenoid 52 is arranged to be alternately energized and deenergized by closing and opening a switch 57 and in actual practice such switch will be automatically actuated by suitable means, not shown, whereby a predetermined rate of actuation of the mechanism herein described may be effected.

The operation of the apparatus described above is as follows:

Assuming the parts to be relatively positioned as shown in the drawing—i. e., with the pistons 35 and the turnbuckle 32 in uppermost position—the outer race 22 of the over-running clutch 21, 22 will be in its most advanced rotational position because of the maximum angular relation of the toggle links 25 and 27 to one side of the common plane of the axes of pins 24 and 26. If switch 57 is now closed air pressure is admitted through conduit 49 into the upper end of tubular member 39 and into the bore 41 of the valve core 40 and thence through aperture 42 against the ball check 44. The latter opens and air is admitted through aperture 46 into the lower end of the tubular member 39 and through fitting 38 into the outer end of the cylinder 34 causing the piston 35 and the rod 37 to move downwardly. As the rod 37 moves downwardly the valve core 40 follows it under the action of the spring 47 and eventually the apertures or ports 45 are uncovered to admit a much larger quantity of air into the cylinder 34. Rod 37 has abutting relation with the inner end of the valve core 40 and after downward movement of the latter is arrested by the flange 48 the outer end of the rod 37 moves away from the core 40.

During downward movement of the rod 37 and consequently of the turnbuckle 32 as well as of the crosshead 31 and the links 30 the toggle links 25 and 27 move into aligned relation whereby the clutch race 22 is fully retracted but no movement has as yet been imparted to the shaft 15 due to the over-running nature of the outer race 22. Thereafter, however, continued downward movement of the motor parts causes the toggle comprised of the links 25 and 27 to break on the other side of the plane above mentioned to thereby forcibly rotate the clutch race 22 back toward its advanced position, imparting an increment of rotation of movement to the drive shaft 15 of predetermined dimension which can be readily controlled as will hereinafter become more fully apparent.

To control the length of stroke of the air motor employed and thus to control the longitudinal spacing of the successive indexed positions of the work pieces as well as to cushion the deceleration of the reciprocating and other intermittently moving parts of the drive the structure above described functions as follows: when the upper cylinder 34 is being energized as above described the air in the lower cylinder outwardly of the diaphragm of the ring 36 therein is being exhausted through the ports 45 contained in the valve core 40 housed within the lower tubular member 39 and through conduit 56. As the end of downward stroke is reached the lower end of the lower rod 37 contacts the upper end of the lower valve core 40 and the latter begins to move whereby the ports 45 therein pass into the restricted section of the bore in the lower tubular member 39 and thus the exit of air from the lower cylinder is gradually choked off to controllably decelerate the moving parts. Thereafter, the leakage of air between core 40 and the restricted portion of the bore in the member 39 will allow the piston in the lower cylinder 34 to gradually bottom.

The above cycle of operation takes place during one period of energization of the solenoid 52. If now the switch 57 is opened to deenergize solenoid 52 whereby spring 54 moves the core of valve 50 back to its initial starting position air is admitted to the lower cylinder 34 through conduit 56 and conduit 49 is connected to the exhaust. At this time the upper rod 37 will be spaced from the upper valve core 40 and the air in the upper cylinder 34 can bleed out through the ports 45 and bore 41 of the valve core 40. As the upper piston 35 approaches the end of its upward stroke upper valve core 40 is engaged to gradually close off ports 45 thereby entrapping the air remaining in the upper end of cylinder 34 to cushion the deceleration of the parts. Again, leakage about the barrel of upper core 40 allows the upper piston 35 to slowly seek its uppermost position.

Since one of the opposed cylinders 34 continues to exert force and movement until the piston in the other of the cylinders 34 has bottomed it is obvious that the length of stroke may be varied simply by varying the spacing between the pistons in the respective cylinders and this may be accomplished by rotating the turnbuckle 32 as will be understood. By shortening this spacing a longer stroke is obtained to give a longer increment of indexing movement to the welding wheel 10. During each stroke of the air motive means only a portion of the elapsed time is consumed by indexing movement, the remaining portion being available for the "dwell" time of the electrodes during which dwell time a current pressure cycle may be applied to the electrode 10, for example, to effect a spot weld. If the adjusted position of turnbuckle 32 is centralized the indexing time and the dwell time during each stroke will be equalized and this will remain true during any adjustment of the turnbuckle 32 provided the threads on the two rods 37 have equal pitch. If desired, provision may be made for the individual adjustment of the lengths of the two rods 37 whereby successive indexing movements will have different dimensions but with the spacing between alternate indexed positions being equal. Thus, the mechanism may be adjusted to give two spots close together on the work and then a larger space before coming to the next two succeeding spots. This is desirable in some classes of work.

By simply reversing the operating direction of the clutch parts 21 and 22 we may cause the indexing movement to take place during the first portion of each stroke of operation of the air motor rather than during the last portion thereof as in the arrangement described above and this change in arrangement is advantageous in that the time consumed in the cushioning and bottoming of the cylinders in either direction of movement always occurs during the dwell period of the roller electrode or other driven part. Also, this arrangement would assure "sine wave" deceleration of the electrodes and work pieces at the end of each indexing movement to prevent over-running and to assure positional stability of the electrodes and the work during the actual welding cycles.

To give a visual indication of the extent of indexing movement being effected in each cycle we provide a vernier scale comprising a fixed part 58 which is rigidly mounted on the housing 16 and a movable part 59 which is rigidly carried by the segmental bracket 23 which is in turn secured to the clutch race 22 as explained above. A principal scale 58a reading in degrees is affixed on the part 58 and the vernier scale 59a reading in minutes is affixed on the part 59.

Shaft 15 is retained in indexed position by a friction brake comprised of the shoes 60 and 61 which are biased inwardly against a collar 62 keyed on the shaft, a spring 63 being provided for effecting this bias.

Figure 6:
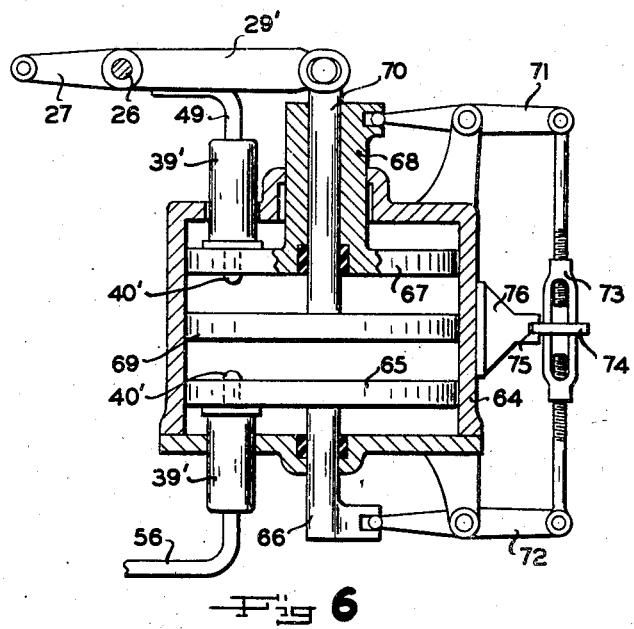
Figure 6 is a schematic section through a modified form of air motor which may be utilized in the assembly of Figures 1 and 3.

In Figure 6 we have illustrated a double-acting air motor which may be substituted bodily for the motor comprised of the parts 30 through 48 of the apparatus first described above. In this embodiment we provide a double-ended cylinder 64 in which is positioned the lower piston 65 carried by a stem 66 which projects outwardly of the lower end of cylinder 64. Also provided is an upper piston 67 which is carried by a hollow stem 68 projecting upwardly out of the upper end of cylinder 64. An operating piston 69 is positioned intermediate the pistons 65 and 67 and is carried by a rod 70 which extends through the stem 68 and which is pivotally connected at its outer end to a lever 29' which in the integration of the apparatus with the assembly of Figures 1 through 5 would take the place of the levers 29. Thus, lever 29' would be keyed to the shaft 26 for operating the toggle link 27.

The length of stroke of the operating piston 69 may be varied while yet maintaining its center of operation fixed by moving the pistons 65 and 67 inwardly and outwardly in equal amounts and this is accomplished by the levers 71 and 72 which are pivoted on the cylinder 64 and which at one end engage the stems 68 and 66, respectively. The opposite ends of levers 71 and 72 are connected together by a turnbuckle 73 which has affixed thereto an annulus 74 which engages in a slot 75 formed in a retaining member 76. So long as the latter is detained in a fixed position rotation of the turnbuckle 73 in one direction moves the limiting pistons 65 and 67 outwardly in equal increments while upon rotation of the turnbuckle in the opposite direction the limiting pistons are moved inwardly to shorten the length of the stroke. By adjusting the stop 76 upwardly or downwardly the operational center of the piston 69 may be shifted to give unequal spacing to the successive indexing movements as explained above.

The end walls of cylinder 64 are apertured to slidably receive the tubular members 39' which are rigidly secured at their inner ends in threaded apertures formed in pistons 65 and 67. The tubular members 39' correspond in structure and function to the members 39 in the first described embodiment and each contained all the mechanism contained in the members 39, the only modification being that the valve cores 40 are each provided at their inner ends with an integral projection 40' which is arranged to be engaged by the piston 69 during normal operation of the same. Thus, the piston 69 is brought to an air-cushioned stop at the end of its stroke in either direction. As shown, the air supply conduits 56 and 49 of the system are connected to supply air under pressure to the bottom and top sides, respectively and alternately, of the piston 69 through the fittings 39' during normal operation of the system.

It should be particularly noted that in either of the embodiments described above two indexing movements are effected for each energization of the solenoid 52 and thus for each full cycle of operation of the valve 50. This enables high speed machine operation while yet keeping the speed of operation of the solenoid valve 50, 52 and of the switch 57 within reasonable limits. The operating speed of the indexing mechanism proper, however, may be quite high due to the cushioning of the air cylinders under any condition of adjustment and to the fact that the final bottoming of the pistons in the air cylinders may be made to take place during the time interval that is consumed in the actual welding or in other working process as the case may be. Of course, the actual speed of operation of the indexing drive once the switch 57 has been opened (or closed) is determined by the volumetric rate of air supply and a high potential rate of operation may accordingly be assured by making the air supply conduits and the ports in valve 50 rather large. Suitable metering valves, not shown, may be employed to control the rate of air flow.

It should now be apparent that we have provided an improved drive for a welding electrode or other machine element capable of effecting highly versatile movement patterns therein which accomplishes the objects initially set out. In addition to the instantaneous changeover from continuous to intermittent movement and vice versa the arrangement provides for infinite adjustment of the dimension of indexing movement from zero to the maximum capacity of the installation, provides for unequal dimensioning in successive indexing movements, if desired, and provides for unlimited extension of the dwell time periods. The latter results from the employment of the control switch 57 which may be opened and closed as rapidly as desired. The employment of this switch is further advantageous in many applications as well as in resistance welders since it may be employed as an element to synchronize the flow of weld current or other operation during the dwell periods.

The above specifically described embodiment of the invention should be considered as illustrative only as obviously many changes may be made therein without departing from the sphere or scope of the invention. Reference should therefore be had to the appended claims in determining the scope of this invention.

We claim:

1. Apparatus of the character described comprising a shaft to be driven, power means to rotate said shaft in a continuous manner, an overrunning clutch interconnecting said power means and said shaft, a second overrunning clutch having a driven member fixed on said shaft and a driving member journaled on said shaft and operative to impart rotational movement to said driven member when rotated in one direction and to freewheel on said shaft when rotated in the opposite direction; and means to impart to and fro rotation to said driving member comprising a lever pivotally mounted intermediate its ends for movement about an axis extending parallel with said shaft, a toggle link pivotally connected at one end to the outer periphery of said driving member and at its other end to one end of said lever, and reciprocating power means connected to the other end of said lever to rock said lever back and forth through an arc to thereby impart to and fro rotation to said driving member during each uni-directional movement of said power means.

2. Apparatus of the character described comprising a shaft to be driven, an overrunning clutch having a driven member fixed on said shaft and a driving member mounted for rotation about the principal axis of said shaft and operative to impart rotational movement to said driven member when rotated in one direction and to freewheel with respect thereto when rotated in the opposite direction, a lever pivotally mounted for rocking movement about an axis generally parallel with said first mentioned axis and having a free end, a drive link pivotally connected at one end with said driving member and pivotally connected at its other end with said free end of said lever, and power means to rock said lever through a dead center position during each uni-directional movement of said power means.

3. Apparatus according to claim 2 further characterized in that said power means includes stop means to limit the movement of said lever in either direction whereby the range of movement of said lever is such that during movement of said lever in one direction the pivotal connection between said driving link and said lever moves from a predetermined distance on one side of the plane passing through the pivotal axis of said link at said driving member and the pivotal axis of said lever to a point on the opposite side thereof an equal distance from said plane.

4. Apparatus according to claim 3 further including a double-acting reciprocating air motor connected to said lever for actuating the same, and means to control the length of stroke of said motor to thereby control the extent of rotation of said shaft in each cycle of operation.

5. Apparatus of the character described comprising a shaft to be driven, an overrunning clutch having a driven member fixed on said shaft and a driving member journaled for rotation about the principal axis of said shaft and operative to impart rotational movement to said driven member when rotated in one direction and to freewheel with respect thereto when rotated in the opposite direction, a double-acting reciprocating air motor, and linkage means connecting said driving member with said motor to oscillate said driving member upon movement of said motor in a single direction.

6. Apparatus according to claim 5 further including adjustable stop means on said motor to limit the length of stroke thereof whereby the extent of rotational movement of said shaft upon each uni-directional stroke of said motor may be varied.

7. Apparatus according to claim 6 including an indicator for indicating the successive increments of rotational movement imparted to said shaft and comprising an arcuately shaped scale fixed with respect to the axis of rotation of said shaft and a cooperating arcuately shaped scale rigidly carried by said driving member.

8. Apparatus for imparting intermittent rotation to a shaft comprising a housing having side walls through which said shaft extends, an overrunning clutch having an inner driven member secured to said shaft within said housing and an outer concentric driving member encircling said driven member, a rock shaft journaled in said side walls for movement about an axis spaced from but generally parallel with the longitudinal axis of the first mentioned shaft, toggle links positioned within said housing and pivotally interconnecting a peripheral portion of said driving member with said rock shaft whereby upon rotation of said rock shaft through a predetermined arc in either direction said driving member is rotated first in one direction and then in a reverse direction, a double-acting reciprocating fluid pressure motor mounted on said housing, and a crank arm positioned outside said housing and keyed at one end onto said rock shaft and pivotally connected at its other end with said motor.

9. Apparatus according to claim 8 further characterized in that said motor comprises a pair of spaced opposed cylinders, a piston in each cylinder, a common drive rod interconnecting said pistons, said crank arm being pivotally connected to said common rod.

10. Apparatus according to claim 9 further including means to vary the length of said common rod intermediate said pistons whereby the length of stroke of said motor may be varied.

11. Apparatus according to claim 8 further characterized in that said motor comprises a cylinder, a piston in said cylinder connected to said crank arm, and adjustable means in said cylinder to limit the extent of movement of said piston therein in either direction.

References Cited in the file of this patent

UNITED STATES PATENTS

| Number | Name | Date |
|---|---|---|
| 702,652 | Ivor | June 17, 1902 |
| 1,097,895 | Thomson | May 26, 1914 |
| 1,098,760 | Reed | June 2, 1914 |
| 1,353,684 | Wagner | Sept. 21, 1920 |
| 1,418,068 | Collins | May 30, 1922 |
| 1,481,912 | Kane | Jan. 29, 1924 |
| 1,503,670 | Stoop | Aug. 5, 1924 |
| 1,594,192 | Bodman | July 27, 1926 |
| 1,749,645 | Neas | Mar. 4, 1930 |
| 1,919,288 | Bath | June 25, 1933 |
| 2,000,890 | Huebler | May 7, 1935 |
| 2,213,709 | Lex | Sept. 3, 1940 |
| 2,278,887 | Larson | Apr. 7, 1942 |
| 2,392,421 | Stephens | Jan. 8, 1946 |
| 2,398,178 | Ellison | Apr. 9, 1946 |
| 2,463,900 | Nicholson | Mar. 8, 1949 |

FOREIGN PATENTS

| 506,978 | Great Britain | June 7, 1939 |

OTHER REFERENCES

"Applied Kinematics," Billings, 2nd edition, January 1943.